June 25, 1963 N. R. CASTELLINI 3,095,560
METHOD AND APPARATUS FOR DETERMINING COLLISION COURSES
Filed Jan. 5, 1959 2 Sheets-Sheet 1
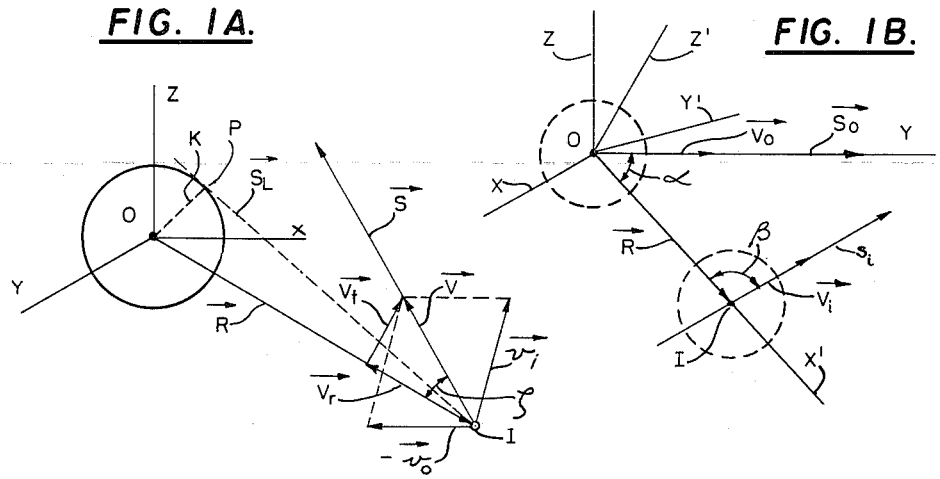
FIG. IA.
FIG. IB.
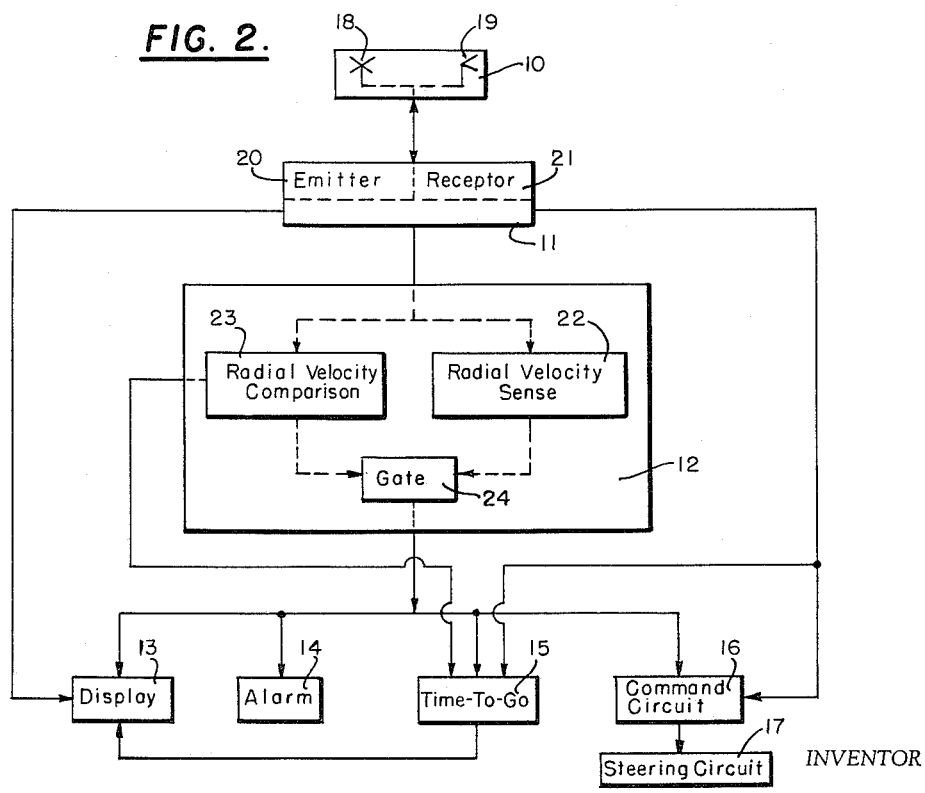
FIG. 2.
INVENTOR
Nello R. Castellini
BY Moore & Hall
ATTORNEYS June 25, 1963　　　　N. R. CASTELLINI　　　　3,095,560
METHOD AND APPARATUS FOR DETERMINING COLLISION COURSES
Filed Jan. 5, 1959　　　　　　　　　　　　　2 Sheets-Sheet 2
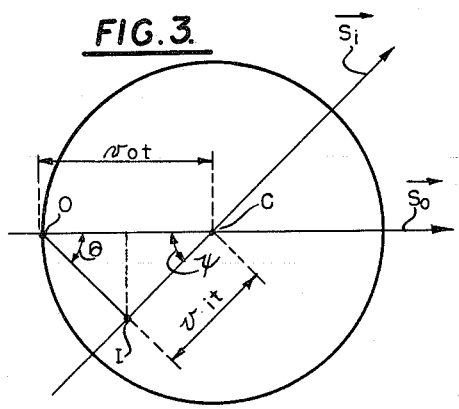
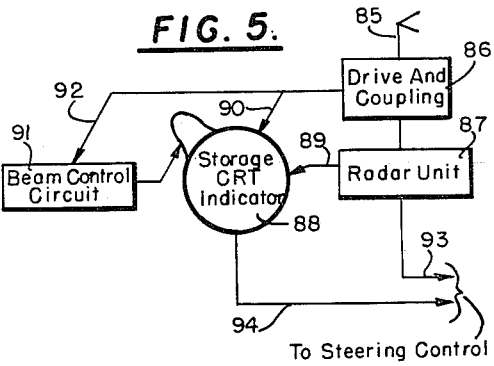
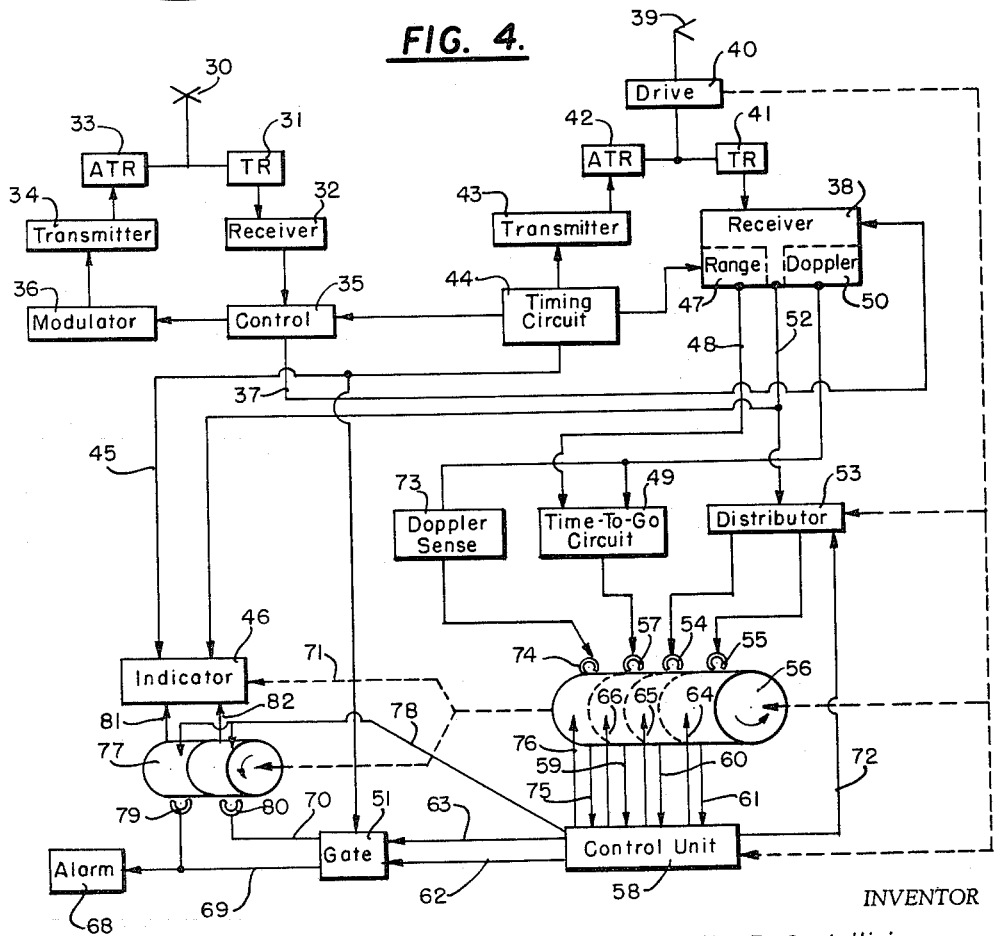
INVENTOR
Nello R. Castellini
BY Moore & Hall
ATTORNEYS

United States Patent Office 3,095,560
Patented June 25, 1963

3,095,560
METHOD AND APPARATUS FOR DETERMINING
COLLISION COURSES
Nello R. Castellini, 42 Bruce Road, Red Bank, N.J.
Filed Jan. 5, 1959, Ser. No. 784,951
19 Claims. (Cl. 343—5)

The present invention relates to an improved method and apparatus such as may be employed in conjunction with moving vehicles to determine when two or more of such vehicles are on a collision course. In a preferred embodiment of the invention, the method and apparatus is employed for collision prevention; but, as will become apparent from the subsequent description, the basic principles involved in such collision prevention find equal application in collision guidance, wherein a collision is intentionally desired, i.e. in guiding a vehicle or missile toward another vehicle or missile; and it must therefore be understood that this latter concept is contemplated in the subsequent description and appended claims whenever the phrase "collision prevention" is employed.

Collision prevention systems are of considerable interest in relation to ground, sea and air traffic; and are particularly desired to inform, warn, and if necessary automatically assume control from, an operator of a vehicle, when said vehicle is determined to be on a collision course with another object which may be either moving or stationary. In general, a true collision prevention system must be able to predict and inform an operator or a navigation computer that the vehicle trajectory intersects the trajectory of another vehicle; and it must be able to perform these functions over a relatively large solid angle in which intersecting trajectories or collision courses may exist.

Various systems have been proposed in the past for giving collision warning information, or for effecting guidance of a moving vehicle when it is on a collision course. In general, however, systems proposed heretofore have taken the form of warning devices and proximity indicators which, by their very nature, provide insufficient information to avoid collision under certain circumstances; and various systems suggested heretofore which purport to prevent collision have in general been so arranged that they may effect this function only in a particular direction (e.g. when the moving vehicle is on a "head on" collision course); or in the alternative, seek to avoid collision under more general conditions with incomplete information, wherefore collision avoidance may be expected to fail in some circumstances.

The present invention, recognizing these deficiencies of systems suggested heretofore, is concerned with a novel method of collision prevention which is based upon a unique approach to the kinematics of collision; and, as will become apparent subsequently, the present invention, by noting basic factors which are determinative of the presence or absence of collision courses, provides apparatus adapted to provide warning indications or automatic control which assures collision avoidance (or intentional collision, if that be desired), under all possible conditions of operation.

As will become apparent, in order to avoid collision between any two objects, at least one of which is in motion, one of the following conditions must be satisfied:

(a) The relative radial velocity between said two objects, i.e. the apparent velocity along a line of sight measured by either one of said objects as an observer, must be equal to or greater than zero;

(b) The magnitude of the apparent angular speed of the rotating axis associated by the observer object with the interfering object, must be greater than a certain quantity which is proportional to the sum of the true speeds of the objects and inversely proportional to the square of the range between them. The constant of proportionality, in this regard, is a function of the spatial extension of the vehicle as well as of various safety factors which may be desired.

The foregoing two conditions are, as will be developed subsequently, equivalent to the single condition which states that the product of the ratio of the tangential component to the radial component of the relative velocity and of the range between two relatively moving objects, must be greater than a constant which is equal to a predetermined minimum miss distance between said objects. More simply and all-inclusive, the two conditions discussed previously may be simplified by stating that, as the two objects move relative to one another, the line of sight between said objects should not remain parallel to itself as said motion progresses.

As stated in the above generalizations, collision avoidance and the trajectories adopted to effect such collision avoidance, can be determined by appropriate treatment of tangential and radial components of the relative velocity between relatively moving objects; and can further be determined by appropriate treatment of the line of sight between said objects. The present invention is based upon these conditions which are inherent in the kinematics of collision; and effects a more efficient collision prevention method and apparatus than has been possible heretofore by appropriately determining and treating these factors.

It is accordingly an object of the present invention to provide an improved method of determining when two or more relatively moving objects are on a collision course with respect to one another.

Another object of the present invention resides in the provision of systems based upon a novel interpretation of the kinematics of collision and adapted to prevent (or produce) collision between relatively moving objects.

A still further object of the present invention resides in the provision of collision prevention method and apparatus which takes into account relative radial velocity, relative tangential velocity, miss distance, and "time-to-go" in determining when two or more relatively moving objects are on collision courses.

A still further object of the present invention resides in the provision of collision prevention systems adapted to effect surveillance over a relatively large volume surrounding an observer object and adapted further to determine and concentrate upon objects within said volume which are on collision courses with said observer object, while ignoring other objects within said volume which are not on collision courses.

Still another object of the present invention resides in the provision of a novel method and apparatus which is adapted to determine whether or not relatively moving vehicles are on collision courses with respect to one another by proper treatment of a measured line-of-sight, and changes therein, between a pair of vehicles.

A still further object of the present invention resides in the provision of collision avoidance systems which are adapted to exhibit more reliable operation than has been possible heretofore.

In providing for the foregoing objects and advantages, the present invention contemplates the utilization of a method of collision avoidance based upon proper treatment of relative radial and tangential velocities between two relatively moving objects which may possibly be on collision courses relative to one another. This determination of relative radial and tangential velocities in fact results in a corollary which states that the line-of-sight between the vehicles or objects on a collision course should remain essentially parallel to itself as the motion progresses, if that collision course is to be continued;

and accordingly, the method of the present invention, by determining this line-of-sight, and by further determining what is happening to that line-of-sight as the motion progresses, is adapted to effect or avoid collision between two relatively moving objects in a thoroughly reliable but relatively simple manner.

The method itself, as will be discussed subsequently, may be readily implemented to provide completely automatic collision avoidance arrangements; and in the alternative, the factors effecting such collision avoidance may be utilized merely to give warning indications or to provide semi-automatic control when collision conditions are present. Such implementation may take the form of radar apparatus, beacon systems, beacon-radar systems, systems based on beacon-interrogator principles, or interrogator-repeater combinations. Certain typical such arrangements will be discussed in greater detail as the description proceeds; but in each case the system itself is based upon the basic method to be described hereinafter; and accordingly, the actual structures which may be employed may be varied by those skilled in the art within the principles of the present invention (i.e. in those arrangements using beacon or beacon-interrogator sensing structures, radar may be substituted and vice versa), so long as the various controlling factors which are characteristic of the novel collision avoidance method of the present invention are recognized and properly treated.

The foregoing objects, advantages, construction and operation of the present invention will become more readily apparent from the subsequent description and accompanying drawings in which:

FIGURES 1a and 1b are vector diagrams illustrating the kinematics of collision, and the various factors thereof, which are employed in the method and apparatuses of the present invention.

FIGURE 2 is a generalized block diagram illustrating a form of control circuit which may be employed in accordance with the present invention to properly treat the factors illustrated in FIGURES 1a and 1b.

FIGURE 3 is a vector diagram illustrating the operation of an antenna such as may be employed in the arrangement of FIGURE 2 as well as in the arrangements of FIGURES 4 and 5.

FIGURE 4 is a detailed block diagram of a collision avoidance apparatus constructed in accordance with the general principles of FIGURES 1 and 2; and FIGURE 5 is a simplified block diagram of an alternative arrangement constructed in accordance with the present invention.

In order that the kinematics of collision, in accordance with the present invention, may be more fully appreciated, reference is initially made to FIGURES 1a and 1b; and these figures are intended to emphasize the general principles underlying the method of the present invention as well as the design of the various arrangements to be discussed hereinafter. As will become apparent throughout the discussion of FIGURE 1, the actual diagrams illustrated in said FIGURES 1a and 1b are much simplified and depict the basic concepts, rather than a detailed rigorous development, of the kinematics of collision. Notwithstanding this simplification, however, the vector diagrams of FIGURE 1 are sufficiently accurate to depict the various factors which must be treated in practicing the method of the present invention, and in the provision of apparatuses based upon said method.

Referring now to FIGURE 1a, let us initially consider that we have two vehicles or objects in motion over different trajectories, which may or may not intersect. One such vehicle (or object) is designated by the letter O (i.e. the observer vehicle) while the other such vehicle (or object) is designated by the letter I (i.e. the interference vehicle). It will be appreciated, of course, that the relationship between O and I is reciprocal and the roles of observer and interference vehicles or objects can be reversed without in any way altering the general principles to be described hereinafter.

Let us further assume that the O and I vehicles have irregular shapes, wherefore these two vehicles are each enclosed in a spherical shell of diameter K, equal to the largest dimension of the vehicle in question, increased possibly by safety factors such as may be desired. If we should further assume that the absolute velocities of the O and I vehicles are constant and are represented by $\vec{v}_o$ and $\vec{v}_i$ respectively, the relative velocity $\vec{V}$ of the I vehicle referred to the O vehicle may be represented by the equation:

$$\vec{V} = \vec{v}_i - \vec{v}_o \qquad (1)$$

It follows from Equation 1 that the O vehicle can in fact be considered stationary so long as we consider that the I vehicle is moving with a velocity $\vec{V}$ over a trajectory $\vec{S}$, where $$\vec{S} = \int_0^t \vec{V} dt$$

This simplification has in fact been assumed in the vector diagrams of FIGURE 1; and it will be noted that, by reason of the assumptions discussed above, the trajectory $\vec{S}$ is actually a straight line that coincides in direction with $\vec{V}$.

Since the O vehicle has now been assumed to be stationary, it can be taken as the origin of a system of rectangular coordinates $x, y, z$, as indicated in FIGURE 1a. In addition, as will be noted from FIGURE 1a, the I vehicle has been represented as a point while the O vehicle has been represented as a sphere of diameter 2K; and under the conditions with which we are here concerned, this is equivalent to considering that each of the O and I vehicles is disposed within spheres of diameter K respectively.

The vectors $\vec{v}_i$ and $\vec{v}_o$, representing the absolute velocities of the I and O vehicles respectively, and the resultant relative velocity vector $\vec{V}$, as well as the trajectory $\vec{S}$ of said relative velocity vector have all been illustrated in FIGURE 1. The line-of-sight between the O and I vehicles has been represented by $\vec{R}$; and it will further be observed that the relative velocity and trajectory $\vec{V}$ and $\vec{S}$ of the two vehicles does not normally coincide with $\vec{R}$ but makes with it an angle $\zeta$ which has a value depending upon the absolute velocities of the vehicles as well as (although not readily apparent from FIGURE 1) upon the O and I trajectory characteristics which are expressed implicitly in $\vec{R}$.

With time, the I vehicle appears to move along $\vec{S}$. As the motion progresses, therefore, $\vec{R}$ will necessarily undergo changes of length, and will also tend to experience a rotation about the origin O. It is the sign and magnitude of these effects that are of importance in collision problems such as here. The relative velocity $\vec{V}$ can be resolved into radial and tangential components $\vec{V}_r$ and $\vec{V}_t$, with these components being represented by the expression:

$$\vec{V} = \vec{V}_r + \vec{V}_t \qquad (2)$$

A moment's reflection will show that $\vec{V}_r$ (the radial component of relative velocity) must equal the vector rate of change in the length of $\vec{R}$ as the motion progresses; and $\vec{V}_t$ (the component of tangential relative velocity)

will simultaneously vary in accordance with the rotation of $\vec{R}$ about the origin O, inasmuch as $\vec{V}$ is the sole motion causing these radial and tangential components.

The trajectory $\vec{S}$ assumed in FIGURE 1a, has been chosen to represent a condition where collision will not occur, i.e. $\vec{S}$ misses the sphere surrounding point O. A collision will result only if the conditions are such that $\vec{S}$ actually intersects the sphere about O; and accordingly, the limiting conditions for the occurrence of a collision may be taken as that position of $\vec{S}$ (represented in FIGURE 1a as broken line $\vec{S_L}$) at which the trajectory $\vec{S}$ becomes at least tangent to the sphere about point O. For this limiting condition, which could lead to a collision, one deduces the following from FIGURE 1a:

$$\vec{V_r} < 0 \quad (3)$$

i.e. the component of radial velocity is negative whereby the O and I vehicles are approaching one another. Also:

$$|\sin \zeta| = \left|\frac{V_t}{V}\right| \leq \left|\frac{K}{R}\right| \quad (4)$$

or:

$$|\tan \zeta| = \left|\frac{V_t}{V_r}\right| \leq \left|\frac{K}{\sqrt{R^2 - K^2}}\right| \quad (5)$$

The conditions represented by Equations 3, 4 and 5, supra, therefore represent those conditions which should be avoided when a collision is to be guarded against; or in the alternative, those conditions which should be met if a collision is to be effected.

The bounds specified by the righthand sides of Equations 4 and 5 depend on the value assigned to K as well as on the distance between the vehicles at the time of observation. At very great distances, assuming that K is small, i.e. of the order of a few tenths of a mile at the most, the value of the bound is small. This bound, however, gradually increases toward one or toward $\infty$, as the range approaches K. Obviously, it is important to detect a potential collision when R is large, or at least where R is much larger than K. Accordingly, the angle $\zeta$ of interest in the collision problem is necessarily a very small angle, and is indeed sufficiently small so that, in both Equations 4 and 5, the sine and tangent functions can be replaced by their argument.

Making this substitution in Equation 4, we may then write:

$$V\zeta \doteq V_t \quad (6)$$

As mentioned previously, however, $V_t$ is the tangential speed of the terminus of the range vector $\vec{R}$; and accordingly, if $\Omega$ represents the rate of turning of this vector, due to the motions of the bodies, the tangential vector can be represented by the expression:

$$V_t = R\Omega \quad (7)$$

Substituting Equation 7 in Equation 6 we then find that:

$$V\zeta \doteq R\Omega \quad (8)$$

which shows that for a given relative velocity between the bodies, collision conditions imply and require a very small rate of turning of $\vec{R}$, i.e. a very small rate of turning of the line-of-sight between the two vehicles. Equation 8 can in fact be written as follows $$\zeta ds \doteq R d\omega \quad (9)$$

where $ds$ is the differential distance along $\vec{S}$ between two successive positions of the I vehicle, and $d\omega$ is the corresponding differential angle between the two range vectors drawn to these positions. It is also apparent that, under collision conditions, successive line-of-sight vectors $\vec{R}$ will have approximately the same direction.

These various factors can be summarized and expressed more emphatically by stating that, under collision conditions, the line-of-sight between the vehicles or objects in question remains closely parallel to itself as the motion progresses; and this represents the first basic consideration upon which the method and apparatuses of the present invention rely.

The application of the conditions specified in Equations 3, 4 and 5 requires expressions for $V_r$ and $V_t$ which are explicit in terms of the absolute velocities of the vehicles and of the characteristics of their trajectories. These expressions can be obtained by a more detailed investigation of the actual relative motion of the vehicles in space, shown in FIGURE 1b. In this figure, XYZ represent a set of axes fixed at center of the navigation platform of the O-vehicle, and so oriented that the X axis and the Y axis coincide or remain parallel with the transverse axis and the $S_o$ trajectory respectively; and the X'Y'Z' axes are another set having the same origin, but an orientation which, as the motion progresses, changes in such a way that the X' axis always remains coincident with the line of sight R, and the Y' axis always lies in the XY plane. In this regard, only the results of such an analysis will now be given; and more particularly, only those results will be given which are useful in showing the relationship of the speeds $V_r$ and $V_t$ to some Doppler measurements which are useful in apparatuses implementing the method of the present invention.

These results, utilizing the various symbols depicted in FIGURE 1b, are as follows:

$$V_r = v_o \cos \alpha - v_i \cos \beta \quad (10)$$
$$V_t = v_o \sin \alpha + v_i \sin \beta \quad (11)$$
$$\frac{V_t^2}{R} = -v_o \sin \alpha \dot{\alpha} + v_i \sin \beta \dot{\beta} \quad (12)$$

In the Equations 10 through 12 given above, $\alpha$ and $\beta$ are the direction angles of the trajectories, $\vec{S_o}$ and $\vec{S_i}$, of the O and I vehicles respectively, referred to the line-of-sight $\vec{R}$ between said vehicles; and dots are used to indicate time derivatives.

Certain further factors should be noted. As mentioned above, Doppler frequencies and the rate of change thereof may be employed to determine radial and tangential components of relative velocity; and the use of such a Doppler technique in implementing the method of the present invention represents a preferred embodiment of the invention. Certain of the apparatus to be described hereinafter is adapted to derive necessary information from such Doppler frequencies; and accordingly, a brief discussion will now be given to show how such Doppler frequencies and their rate-of-change may be employed to measure V and $\Omega$, i.e. the rate-of-turning of the line-of-sight.

Let us first consider that, in the arrangement depicted in FIGURE 1b, a source of energy having a frequency $f_i$ is located at the I vehicle. If the frequency measured at the observer vehicle O, emanating from the interference vehicle I, is denoted by $f_{oi}$, it is known (ignoring the velocity of the medium between the two vehicles) that the following expression must hold:

$$f_{oi} = \frac{c + v_o \cos \alpha}{c + v_i \cos \beta} f_i \quad (13)$$

where c equals the phase velocity of the disturbance in the medium, and the velocities are considered positive in the direction of the positive x' axis.

The corresponding Doppler frequency $f_{doi}$ is defined as the difference between the frequency received and the original frequency, i.e.:

$$f_{doi} = f_{oi} - f_i \quad (14)$$

If we should now substitute Equation 13 in Equation 14 we find, after some reduction, that:

$$f_{doi} = \frac{v_o \cos \alpha - v_i \cos \beta}{c + v_i \cos \beta} f_i \qquad (15)$$

and comparison of Equation 15 with Equation 10 shows that Equation 15 may actually be represented as follows:

$$f_{doi} = \frac{V_r}{c + v_i \cos \beta} f_i \qquad (16)$$

Equation 16 is one of the desired equations and shows that the relative radial velocity $V_r$ can in fact be determined by a Doppler technique. In regard to Equation 16 it should further be noted that if the energy is electromagnetic, the term $v_i \cos \beta$ can be neglected in comparison with $c$ at conventional speeds, whereby Equation 16 can be further simplified to establish a more easily usable relationship between Doppler frequency and velocity.

Turning now to the question of the angular rotation of $\vec{R}$ we find, by differentiating Equation 13 with respect to time and by substituting Equation 14 in the resulting expression and neglecting terms that are small in comcomparison with $c$, as well as with the terms $v_o$ and $v_i$, that:

$$\dot{f}_{doi} \doteq \frac{-v_o \sin \alpha \dot{\alpha} + v_i \sin \beta \dot{\beta}}{c + 2v_i \cos \beta} f_i \qquad (17)$$

Equation 17 can be further simplified as follows, by comparison with Equations 12, 6, and 8:

$$\dot{f}_{doi} \doteq \frac{R\Omega^2}{c + 2v_i \cos \beta} f_i \qquad (18)$$

and here too the expression $2v_i \cos \beta$ can in general be neglected if the energy is electromagnetic. Accordingly, Equation 18 shows that the rate of turning of the line-of-sight vector can also be determined from proper treatment of Doppler frequency.

The foregoing development has, of course, assumed that we have "one-hop" transmission, i.e. energy is being radiated from the I vehicle toward the O vehicle. In the event that we use round-trip transmission, however, such as occurs in radar or in repeater type responders, Equation 13 must be applied to both transmission paths. By so using Equation 13 and by proceeding in the manner described above with respect to Equations 14 through 18, we find that in such round-trip transmission systems, the following expressions apply:

$$f_{doo} \doteq \frac{2V}{c-V} f_o \doteq \frac{2V}{c} f_o \qquad (19)$$

and $$\dot{f}_{doo} \doteq \frac{2R\Omega^2}{c-2V} f_o \doteq \frac{2R\Omega^2}{c} f_o \qquad (20)$$

In Equations 19 and 20 given above, $f_o$ is the frequency of transmission from the observer vehicle O, while $f_{doo}$ is the frequency of the energy received at the observer vehicle O after reflection from the interference vehicle I. Again, however, we find that both the relative velocity and the rate of turning of the line-of-sight vector between the vehicles can be determined by proper treatment of Doppler frequencies.

As is established by the entire foregoing development, whether or not two vehicles or other relatively moving objects are on collision trajectories, may be determined by proper interpretation of the relative radial and tangential velocities (or magnitude of resultant relative velocity) between said vehicles as well as by a proper interpretation of the rate of turning of the line-of-sight between said vehicles; and these factors of themselves give information which may be reliably employed under all practical conditions to determine whether or not two relatively moving objects are on a collision course. As is further esttablished by the foregoing development, these factors may in turn be determined by proper treatment of Doppler frequencies, wherefore the method of collision prevention which is characteristic of the present invention can be readily implemented through the use of apparatus adapted to take appropriate Doppler measurements.

The foregoing mathematical development may in fact be readily summarized by stating that a collision between two vehicles will occur only if the radial component of the relative velocity between said vehicles is negative and the tangential component of said relative velocity is nearly zero for the actual vehicles (actually it is zero for a collision to occur between the mass centers of the vehicles). These conditions of negative radial component and substantially zero tangential component may be further summarized by stating that, excluding relatively short ranges, the line-of-sight between two vehicles on a collision course will remain essentially parallel to itself as the motion progresses. These basic considerations can be used as criteria for navigation, to either cause a collision or avoid one. Such a navigation technique can be effected by provision of a system capable of probing space for other vehicles or objects; capable of measuring radial and tangential components of the respective velocities; and capable of establishing an appropriate reaction, either to guide the vehicle toward or away from a collision point, or to give an indication, wherefore such guidance may be manually or semi-automatically effected.

One further factor should be noted. The radial velocity between two vehicles on a collision course may vary within wide limits, depending on the angle between the actual trajectories of those vehicles. It therefore becomes important to establish the "time-to-go" between a vehicle's present position and the collision point, since such time-to-go will undergo a similar variation. This in turn means that the reaction time and rate of change of course or speed can be very slow when the time-to-go is relatively large; and must be fast when the time-to-go is relatively small.

In systems adapted to utilize the various factors discussed previously, therefore, it is necessary to know the time-to-go in order that a proper rate of vehicle control can be determined. As a general matter, such time-to-go has significance only if the vector $\vec{S}$ (actually $\vec{S}_L$) in FIGURE 1a intersects the sphere about O in some point P; then we have, letting $S_p$ be the distance between I and P:

$$t = S_p/V \qquad (21)$$

As a practical matter, however, it is clear under these conditions that $S_p \doteq R$ and $V \doteq V_r$; therefore, we can write Equation 21 approximately as:

$$t \doteq R/V_r \qquad (22)$$

i.e. the time-to-go is directly dependent upon the distance between the two vehicles and inversely proportional to the relative velocities of said vehicles. Systems adapted to effect vehicle control in accordance with the radial and tangential vectors of relative velocity and in accordance with the rate of turning of the line-of-sight between said vehicles, should therefore further include means for determining how fast a control reaction must be effected once a collision course is detected; and the apparatus to be described hereinafter accomplishes this result by taking into proper consideration the time-to-go.

Let us now consider some typical structures which may be employed to implement the collision prevention method described above. FIGURE 2 shows a generalized block diagram of a detection and control apparatus adapted to effect collision prevention in accordance with the factors already described. A more detailed embodiment will be described subsequently in respect to FIGURE 4, but in the generalized arrangement of FIGURE 2, the apparatus comprises in essence an antenna arrangement 10 associated with a sensor unit 11, a velocity computer 12, a display unit 13, alarm 14, time-to-go circuit 15, command circuit 16, and steering circuit 17.

The antenna unit 10 includes an omnidirectional antenna 18 and a directional antenna 19; and these antennae may in fact comprise more than one unit to obtain any desired power distribution. It should be noted that vehicles should be made aware of each other's presence through the exchange of some form of energy; and since, in three dimensions, vehicles could approach each other over a solid angle of $4\pi$ steradians, the system should insure that energy is exchanged over this solid angle without exceptions. Without any further qualifications, therefore, the omnidirectional antenna 18 is necessary to meet this requirement. Due to the fact, moreover, that the data obtained by each vehicle must be specific as to direction, the directional antenna 19 should be provided; and space coverage can be obtained by appropriate rotation of said directional antenna 19.

As will be developed subsequently, particularly in reference to FIGURE 3, the directional antenna 19 need not cover a solid angle of $4\pi$ steradians. In this regard it should be observed that only one vehicle need actually take action to avoid a collision; and with this qualification, it can be deduced (and will be developed subsequently) that directional antenna 19 need only cover a solid angle of $2\pi$ steradians forward of the vehicle and with the longitudinal axis of the vehicle as the axis of symmetry. It should further be noted that both an omnidirectional and directional antenna are not necessary, in the event that a radar sensor is employed; and in such a case, it is possible to dispense with one of the antennae.

The antenna unit 10 is, as mentioned previously, associated with a sensor unit 11; and this sensor unit in turn comprises an emitter unit 20 and a receptor unit 21. Emitter unit 20 is adapted to provide energy through omnidirectional antenna 18 for uniformly illuminating the space surrounding the vehicle carrying the apparatus. The receptor 21 is adapted to receive energy emitted or reflected from other vehicles and objects, and is further adapted to reduce this energy to a form usable by the other components of the system. The specific design of sensor 11 may take various forms. By way of example, it can take the form of a radar unit, in which case only directional antenna 19 need be employed; and the energy received by antenna 19 is that originating in the local emitter 20 and reflected back to antenna 19 by an interfering object. The sensor 11 may, in the alternative, take the form of a simple transmitter-receiver system properly interlaced if on the same frequency, to avoid local interference between transmission and reception. Sensor 11 may also take the form of an interrogator-responder combination, in which both a transmitter and receiver are associated with the interrogator as well as with a responder.

In general, it may be stated that sensor unit 11 is designed to enable the system to obtain positional data in terms of range and antenna rotation angle, as well as further data by which the velocity computer 12 may determine or otherwise obtain estimates of the radial and tangential components of the relative velocity between an observing and interfering object. The actual design of the sensor unit, for obtaining such positional and velocity data, can be based on any of several well known principles; and, as discussed previously, Doppler frequency measurements can be, and are preferably, employed to this effect.

Sensor 11 has the output thereof coupled to velocity computer 12 which is adapted to receive voltages related to the relative velocity between the observing and interfering vehicles, as determined by the sensor 11. The purpose of computer 12 is to detect the existence of collision conditions in terms of the values of radial and tangential components. To this end computer 12 comprises, in its basic form, a circuit 22 designed to determine and sense the sign of the radial velocity and designed to furnish an output if that sign is negative. In this regard reference is made to the previous development wherein it was pointed out that collision will occur only if the radial component of relative velocity has a negative sign.

Computer 12 further includes a circuit 23 designed to compare quantities which are proportional to either successive values of the radial velocity actually measured, or which are proportional to successive orientations of the line-of-sight between the vehicles; and unit 23 is adapted to provide an output only if the said comparison shows that the variation in these parameters is less than a prescribed amount. In this regard reference is again made to the previous development wherein it is pointed out that collision will occur only if the line-of-sight remains essentially parallel to itself as the motion proceeds; and unit 23 is adapted to determine this factor.

Computer 12 further includes a gate circuit 24 adapted to provide an output only when outputs occur from both of circuits 22 and 23; for, as also developed previously, the vehicles will be on a collision course only when conditions are such that both of units 22 and 23 provide outputs. The specific design of the circuits 22, 23 and 24 may take various forms, and one specific embodiment performing the functions described will be discussed subsequently in reference to FIGURES 4 and 5.

Display unit 13 is adapted to receive angle and range information from the sensor 11 as well as collision information from computer 12; and said display unit 13 may indeed receive time-to-go information from circuit 15, to be described subsequently. The display unit 13 is actually designed to present targets appearing in the field of view of antenna 19 as if they were projected on a plane normal to the longitudinal axis of the vehicle; and the said display unit 13 (which may comprise a cathode ray tube display), is preferably designed to present said target at a true elevation angle with reference to the equatorial plane at the distance from the center of the display which is proportional to the range. If time-to-go information is also to be displayed, this may be achieved by a suitable marker associated with the target.

Display unit 13, when provided, is adapted to permit an observer to note the presence of targets on or near a collision course with the observing vehicle, whereby an operator may take appropriate action. As a practical matter, targets will appear on the display 13 at only infrequent intervals since targets on a collision or even on a near collision course will be relatively few. Accordingly, to eliminate operator fatigue and lack of interest which might arise from having to examine constantly a display such as 13, an audible alarm 14 is provided. The signal voltages utilized to trip alarm 14 are derived from computer 12 (actually from gate 24), whereby the alarm is given only if collision conditions exist.

As discussed previously, reaction time and rate of change of course or speed will necessarily depend on the time-to-go, when vehicles are on a collision course. The unit 15 is adapted to derive such time-to-go information. In particular, unit 15 receives velocity information from unit 23, receives range information from sensor 11, and provides an output which is proportional to the ratio of the range to the velocity, i.e. proportional to time-to-go (see Equation 22), when a collision course is indicated by an output from gate 24. This time-to-go output produced by unit 15 may, as mentioned previously, be coupled to display unit 13; and it can further be coupled to command circuit 16 to control the rate of change of course or speed when such a change in course or speed becomes necessary due to the existence of possible collision conditions.

It will be appreciated that when computer unit 12 produces an output indicating the presence of a collision course, the essential problem is to avoid ultimate collision. Two decisions must be made before proper command can be given to a steering mechanism such as 17; and these decisions comprise the type of action to take, i.e. how to change speed or direction, and further comprise a decision as to who should take such action, since under many conditions both vehicles might become aware of the impending collision and both vehicles might take action, unless specific rules are stipulated. It is the function of the command unit 16 to make these decisions as well as to give the proper instructions to the steering mechanism or circuit 17, whereby a collision may be avoided.

As a practical matter, decisions of the types mentioned above cannot be taken without specific traffic rules (excepting, of course, a system based entirely on a radar principle wherein collision avoidance is effected by manual control of one vehicle when that vehicle detects a possible collision course with another vehicle). For maximum safety, therefore, systems of the type contemplated herein should have general adoption on a world-wide basis, inasmuch as collision avoidance under best circumstances is a cooperative undertaking. This factor implies not only that all vehicles be provided with suitable equipment of the types described, but also implies that a set of procedures and conventions be adopted by universal agreement on right-of-way, right and left movement, minimum separation, lanes, etc. Assuming that such "traffic regulations" are decided upon, these rules or regulations could be stored in the form of logical programs in a unit such as 16, whereby the command unit 16 would be designed to effect appropriate control of steering circuit 17 in accordance not only with the collision avoidance factors already described, but in accordance with the traffic rules mentioned, as well. In the event that automatic steering control is desired, the output of unit 16 can be translated into command voltages which are in turn coupled to unit 17 to effect mechanical motion of steering linkages or other units controlling the speed and/or direction of the vehicle. It is clear from FIGURE 2, however, that the command circuit 16 comprises a refinement which is optional in nature; and it can in fact be replaced by an essentially manual control operative in conjunction with display unit 13.

The general arrangement of FIGURE 2 may take various forms, some of which have already been described. One specific embodiment of the invention, adapted to derive the collision condition information already discussed, is shown in FIGURE 4. Before proceeding with a detailed description of this figure, however, some further brief discussion with regard to the directional antenna 19 (of FIGURE 2) as well as the directional antenna shown in FIGURE 4, will be of value.

As already mentioned, two vehicles on possible collision courses may approach one another over a solid angle of $4\pi$ steradians; but, as a practical matter, collision avoidance can be effected if an observing vehicle is adapted to detect the presence of possible interfering vehicles within a solid angle of $2\pi$ steradians forward of the vehicle and symmetrical with the longitudinal axis of the vehicle. This consideration is shown in FIGURE 3.

Let us first assume that an observing vehicle O has a trajectory $\vec{S}_o$, while an interfering vehicle I has a trajectory $\vec{S}_i$; and let us further assume that these two trajectories may intersect at a collision point C which is imagined to be the center of a sphere having a radius $v_o t$, where $v_o$ and $v_i$ are the respective absolute speeds of the vehicles and $t$ is the time-to-go before actual collision might occur. Let us further assume that the trajectories $\vec{S}_o$ and $\vec{S}_i$ make an angle $\Psi$ with respect to one another.

With reference to trajectory $\vec{S}_o$, the minimum plane beamwidth of an antenna in the O or observing vehicle, adapted to intercept energy from the interfering or I vehicle is $\theta$. From the geometry shown in FIGURE 3, it will be observed that:

$$\cot \theta = \frac{v_o/v_i - \cos \psi}{\sin \psi} \quad (23)$$

As $v_o/v_i$ varies, the cotangent of $\theta$ attains different values. In particular, these values are as follows:

$$\lim_{v_o/v_i \to 0} \cot \theta = -\cot \psi \quad (24)$$

$$\lim_{v_o/v_i \to 1} \cot \theta = \tan \psi/2 \quad (25)$$

$$\lim_{v_o/v_i \to \infty} \cot \theta = \infty \quad (26)$$

It is clear from these limits [Equations 24 through 26 above] that for a given angle $\Psi$, the single $\theta$ attains its largest value for $v_o/v_i = 1$. Further, considering the middle limit (Equation 25) as a function of $\Psi$, it can be seen that the maximum value of $\theta$ is attained when $\Psi$ equals zero. This leads to a value of $\theta = \pi/2$; and the solid angle corresponding to this value of $\theta$ can be shown to be $2\pi$ steradians disposed, as illustrated in FIGURE 3, forward of the observing vehicle O. Coverage of this type may be obtained by rotating an antenna, placed in the nose of the vehicle, about the longitudinal axis of the vehicle; and such an antenna should be designed with a narrow beamwidth in a plane normal to the longitudinal axis and with a 90° width in a plane containing this axis. Such an antenna characteristic may be readily effected by known techniques through appropriate design of the antenna, reflector, and antenna feed.

As a practical matter, the gain contour of the antenna in the 90° direction is not uniform but should be distorted in such a way that a vehicle at O (see FIGURE 3) will receive constant power from vehicles located on the sphere of FIGURE 3. Such a situation provides the most efficient gain distribution, and it can be shown that in order to achieve this it is necessary that the gain of the fan beam should be made proportional to $\sin^2 \Psi/2$. These factors should therefore be employed in the provision of antennae such as are utilized in the apparatus of the present invention.

Let us now refer to FIGURE 4 which illustrates a more detailed embodiment constructed in accordance with all of the factors described above. The arrangement of FIGURE 4 comprises an interrogator-responder combination, with the interrogator emitting pulses continuously through a directional antenna which is made to rotate uniformly about the longitudinal axis as discussed above, if maximum efficiency and economy of coverage is desired; or about any other axis which the application or design might indicate preferable. The system includes, in addition, a beacon portion which is omnidirectional in character; and the operation of the beacon-interrogator is substantially conventional except that the interrogator includes a receiver which, in addition to determining range and azimuth information, extracts Doppler frequency information. It should be noted that while the beacon portions of the system to be discussed hereinafter are assumed to be of conventional design, a repeater type beacon could be employed in which not only the envelope but also the RF wave is amplified and retransmitted; and such a system would permit simplification of the Doppler frequency-determining circuit.

The arrangement shown in FIGURE 4 actually comprises three major components, i.e. a beacon, an interrogator, and indicator and alarm circuits. The beacon portion includes an antenna 30 which, within limitations set by conventions, has omnidirectional characteristics; and to achieve this, in practice, more than one antenna may in fact be employed. Antenna 30 is connected via a TR switch 31 to a receiver 32; and is also connected via an ATR switch 33 to a transmitter 34. Received signals are passed from receiver 32 to a control circuit 35 which is operative to energize a modulator 36 controlling the transmitter 34 if said received signals arrive during a time which exceeds a predetermined "dead" time. The aforementioned energization of modulator 36 in turn causes transmitter 34 to emit a response pulse after a short fixed delay. Control circuit 35 also supplies blocking pulses over a lead 37 to a receiver 38 in the interrogator portion of the system thereby to protect the measuring and indicator circuits of the overall arrangement during the response interval.

Signals which are received by antenna 30 thus initiate in the beacon portion of the arrangement (i.e. that portion coupled to antenna 30) a series of events such as have been described; and these received signals originate from an interrogator located in some distant vehicle, just as the interrogator signals emitted by the arrangement of FIGURE 4 are intended to be received by some distant beacon to elicit responses therefrom. In short, the arrangement of FIGURE 4, inasmuch as it comprises an interrogator-responder combination, is assumed to be carried on both the observer and interfering vehicles.

The interrogator portion of the system comprises an antenna 39 which is directional in character and which is adapted to have a narrow beamwidth in the direction normal to its axis of rotation and a relatively wide beamwidth in the direction parallel to said axis of rotation. The beam shape of antenna 39 may be set in accordance with the techniques discussed previously in reference to FIGURE 3, in order to assure required coverage. Antenna 39 rotates uniformly, as indicated above, under the control of an antenna drive unit 40; and said antenna 39 is electrically coupled via TR switch 41 to the aforementioned receiver 38 as well as via an ATR switch 42 to a transmitter 43. Transmitter 43 is designed to supply RF pulses to antenna 39 at a regular pulse repetition frequency, under the control of a timing circuit 44.

Timing circuit 44, in addition to controlling the transmitter 43, supplies a number of other time reference pulse outputs adapted to control the timing of the overall arrangements. Thus, timing circuit 44 is coupled to the aforementioned control circuit 35 in the beacon portion of the system; and the timing pulses so coupled to control unit 35 generate blocking pulses operative to protect the overall system from ringing which might occur because of unavoidable coupling between transmitter 43 and receiver 32. Timing circuit 44 also supplies an output via lead 45 to an indicator 46 which is of the cathode ray tube type, wherefore the timing signals on line 45 control sweep circuits associated with this cathode ray tube indicator 46. Timing signals are also coupled to gate 51 where, in conjunction with outputs from unit 58 (to be described), they are used to obtain standardized video and time-to-go signals. In addition, timing circuit 44 supplies timing pulses to a range circuit 47 which comprises a portion of receiver 38.

Receiver 38, in addition to including a conventional video circuit, incorporates, as mentioned, a range circuit 47 operative to supply a voltage output on lead 48 which is proportional to range; and this range voltage is coupled to a time-to-go circuit 49 as one input thereto. Receiver 38 also includes a Doppler frequency-determining circuit 50 which is operative to determine both the magnitude and sign of Doppler signals received by antenna 39. It will be appreciated that the range circuit 47, Doppler circuit 50, and the other components already described and to be described hereinafter in reference to FIGURE 4, are conventional in nature. The output of Doppler circuit 50 is also coupled, as illustrated, to the time-to-go circuit 49.

Receiver 38, in addition to providing the afore-mentioned range and Doppler outputs, supplies video signals via a lead 52 to a distributor 53 which is synchronized and phased in operation with antenna drive means 40 and control unit 58 via lead 72. Distributor 53 is operative to channel these received video signals, in sequence during successive rotations of antenna 39, to a plurality of magnetic recording heads for stepping the recording to an adjacent channel after each rotation; and in the arrangement of FIGURE 4 only two such recording heads 54 and 55 have been illustrated, although it will be understood that more heads could be provided if desired. By reason of this distribution, through the operation of distributor 53, the received video signals are distributed over a plurality of recording channels on a magnetic drum recorder 56; and the embodiment of FIGURE 4 has assumed that there are two such recording channels associated respectively with recording heads 54 and 55. Distributor unit 53 also receives, over line 72 from control unit 58, synchronization voltages which are used in switching the recording from channel to channel in step, and in maintaining the proper phase between the recording and erasing operations, as will be described subsequently.

Drum recorder 56 is adapted to record video information in each of the several channels thereof on successive 360° rotations of antenna 39, and the rotation of drum 56 is in fact synchronized in this regard with the antenna drive unit 40, so that a one-to-one correspondence is established between the position of a particular signal recording on the drum and its direction of arrival in space. By reason of this arrangement, therefore, any signals received during a first rotation of antenna 39 will be recorded on one channel of drum 56 as determined by distributor 53; signals received during a next successive rotation of antenna 39 will be recorded on a next successive channel of drum 56, etc.

In addition to this recording of video information, two further channels associated with recording heads 57 and 74, are provided to record time-to-go information produced by the circuit 49, as well as Doppler sense information from Doppler sense unit 73, respectively. In regard to the time-to-go determination, it will be noted that circuit 49 is supplied with information related to both the range and velocity between the observing and interfering vehicles; and circuit 49 is adapted to provide an output proportional to the ratio of range to velocity, i.e. time-to-go in accordance with Equation 22 given previously. These sense and time-to-go signals are, as mentioned, coupled to heads 74 and 57, and are recorded on separate sense and time-to-go channels of drum 56 during rotation of said drum.

Continuously, and at the same time that information is being recorded on the Doppler sense, time-to-go, and signals channels, the information on all the channels is read out simultaneously through appropriate read-out heads which are positioned so as to have a convenient phase lag with reference to the recording heads, i.e. if phase is measured in the direction of rotation of the drum, the recording occurs at the reference angle $\theta_0$, while the reading out occurs at the angle $\theta_0 + \Delta\theta$ where $\Delta\theta < 360°$ (i.e. it is 180° in FIGURE 4). The read-out information is thereafter coupled to control unit 58 via lines 59, 60, 61 and 75. Control unit 58 is operative to perform several functions. First, it includes a comparison unit adapted to compare the simultaneity of the output signals on lines 60 and 61, i.e. the video signals which have been successively stored in the several video channels of drum 56 during successive rotations of said drum 56 and of antenna 39. In the event that this comparison finds that, within prescribed angular tolerances, signals have been stored in the several video channels of drum 56 during successive rotations of antenna 39 at the same phase angle, as made evident by essentially simultaneous outputs from the read-out heads (this being indicative that the line-of-sight has remained practically parallel to itself, which is one of the collision criteria); and further, if when this occurs the output on line 75 simultaneously indicates a negative Doppler frequency (i.e. the relative radial velocity is one of approach, which is the other collision criteria), unit 58 is operative to generate an output signal on line 62 indicating the existence of a collision course. If this simultaneous video recording situation is not found, or if a positive Doppler frequency is detected on line 75, no signal is generated on line 62.

In short, the comparison circuit in unit 58 will pass information only when all of the factors described previously, which are indicative of a collision course, are found to be present; and if the signal on line 75 is actually zero or is of a polarity indicating that the relative radial velocity between the observing and interfering vehicles is such that the vehicles are moving away from one another, no information will appear at the output of the circuit even though substantially similar video signals are recorded on the video channels of drum 56 during successive rotations of antenna 39.

In the event that the comparison portion of control unit 58 detects collision conditions, wherefore a signal is generated on line 62, the control unit 58 also simultaneously opens a circuit to allow the information in the time-to-go channel of drum 56 to appear on another output line 63. In short, a signal appears on line 62, and time-to-go information appears on line 63 only when it is found that the video signals received during successive rotations of antenna 39 are recorded on successive channels at substantially the same phase angle (which is, of course, indicative of a situation wherein the line-of-sight between the observing and interfering vehicles remains substantially parallel to itself as the relative motion between said vehicles progresses) and when the radial velocity is negative (which indicates that the vehicles approach each other); and in the absence of such a situation, no signals appear on either of lines 62 or 63.

In addition to effecting the comparison operation, unit 58 also includes circuits to insure the synchronization and phasing of the recording, reading and erasing operations and further furnishes voltages to erasing heads associated with recording drum 56, as well as with erasing heads associated with a further recording drum 77 (to be described). These voltages, in respect to drum 56, are supplied to erasing lines 76 and 66 associated with the Doppler and time-to-go channels respectively, and to one of the lines 64 or 65 which is associated with the channel that contains the oldest video information, i.e. the recording channel immediately following the one presently active; and erasing voltages are also supplied to line 78 associated with drum 77. Erasure occurs continuously, but by positioning the erasing heads it is phased so that during each rotation erasure occurs after a read-out operation and before a subsequent recording operation. Timing for the erasing operations can be provided from a ring circiut or a similar such circuit which is caused to run synchronously with the rotation of antenna 39, i.e. which is synchronized with the drive unit 40, as illustrated. Thus, the circuit energizes the erasing head associated with the channel immediately following the active recording channel, and index information to maintain this phase between recording and erasing is provided to distributor unit 53 over line 72.

As is apparent from the foregoing discussion, signals appear on lines 62 and 63 if collision conditions between the observing and interfering vehicles exist. If the bandwidth of the recorder and associated circuit were as good as that of the receiver there would be no differences in the character of the raw video in line 52 and the video obtained from the recorder in line 62. There would, of course, exist a phase difference between the two videos due to space phase between recording and reading heads, but the video on line 62 could be used to provide, in conjunction with information from the timing circuit, a PPI presentation as faithful as that obtainable with the raw video directly. However, the frequency characteristics of the recorder and its circuits may be over one hundred times poorer than that of the receiver circuits; and this precludes the possibility of using the video on line 52 to provide directly a PPI presentation capable of supplying range information. To circumvent this difficulty and still retain the collision discrimination of the system, the arrangement shown in FIGURE 4 is used. In this arrangement the raw video is admitted via line 52 to a circuit in indicator 46 which circuit is under the control of a gate signal supplied over lead 81 from a drum recorder 77. This gate signal is generated from the recorded video in the manner described below, and when present operates the circuit to let the raw video intensity modulate the beam of the indicator; since the recorded video gate is present only if collision conditions exist, a display appears only under these conditions.

The recorded video gate is generated by applying the output of line 62 to a gate 51. Gate 51 also includes, as mentioned previously, a further input which is derived from the timing circuit 44, and this timing input of gate 51 is operative to provide a gate interval of duration somewhat shorter than the reciprocal of the PRF. If now, during this gate interval an input 62 also occurs, gate 51 generates a standardized signal of a duration that depends mostly on design (i.e. is made to last a number of periods of the PRF, with the number of periods depending on the beamwidth of the antenna). This standardized signal appears on line 69 and is applied to recording head 79 of drum 77. At this same time, time-to-go information which is also admitted to gate 51 over line 63 is allowed to pass to recording head 80 via line 70.

As pointed out above if the recording and read-out heads of drums 56 are displaced from each other, the video on line 62 will differ in phase from the raw video on line 52. This same phase difference will exist for the standardized video on line 69. If this standardized video gate were applied directly to the indicator 46 to operate a circuit that permits the modulation of the beam intensity by raw video from line 52, the indicator presentation would be in error because the raw video and standardized video gate do not correspond to the same part of space. The recording drum 77 (which obviously could be a part of drum 56) is provided to compensate for this phase difference. It does this by delaying the application of the standardized video gate to the indicator so that when it is applied over line 81 the phase difference between the videos is exactly 360°. This is accomplished by recording the outputs of gate 51 on two channels of drum 77 associated with recording heads 79 and 80, and by providing corresponding read-out heads associated with lines 81 and 82 which read-out heads have zero space phase with the recording heads 54, 55, 57 and 74 of drum 56. It is clear that since the phase of the standardized video applied to the recording heads of drum 77 with reference to the raw video is less than 360° (i.e. it is 180° in FIGURE 4) and the read-out heads associated with this drum are advanced from the corresponding recording heads an amount that places them in zero space phase with the recording heads in drum 56, the output on line 81 must lead (i.e. have occurred earlier) the raw video by one complete antenna revolution, or 360°. The read-out output on lines 81 and 82 is applied to circuits in indicator 46. Erasing voltages are applied to both channels on drum 77 by erasing heads associated with line 78 as mentioned previously.

An output from gate 51, when it occurs, is also coupled to an alarm circuit 68 to activate that alarm thereby alerting an operator in the observing vehicle that he is on a possible collision course with an interfering vehicle.

Indicator 46 is designed as a conventional PPI, and the beam axis thereof rotates synchronously with antenna 39 under the control of a coupling 71; while the radial deflection thereof is generated from timing pulses supplied on line 45 from the aforementioned timing circuit 44. As indicated above, the indicator also receives raw video over line 52; and this video is applied to the beam intensity circuit through a gate which is under the control of the standardized video wherefore, when this standardized signal is present, the raw video and time-togo information modulates the beam. The information coupled to PPI indicator 46 on lines 52, 81 and 82 thus effects a display which the operator can utilize as a guide for steering a non-collision course.

It will be appreciated that the system of FIGURE 4 comprises only one special instance of the general arrangement shown in FIGURE 2. Another possible arrangement operating in accordance with the various factors discussed, is shown in FIGURE 5; and this latter arrangement is of the radar type and is adapted to again provide a visual indication which can be employed by the operator of an observing vehicle to avoid collisions.

The arrangement of FIGURE 5 is again based on the general principle that the line-of-sight between vehicles on a collision course remains generally parallel to itself as the relative motion between said vehicles progresses. The system consists of an antenna 85 which again has a beamwidth narrow in the direction normal to the axis of rotation and relatively wide in the direction parallel to it, as was the case with antenna 39 of FIGURE 4. Antenna 85 rotates uniformly, like antenna 39, under the control of an antenna drive 86 which unit 86 is also adapted to couple energy between said antenna 85 and a radar unit 87. Radar unit 87 comprises a pulse or pulse Doppler system of conventional design having a relatively high pulse repetition frequency consistent with the range desired. It provides range information to an indicator 88 through an output 89; and also provides Doppler frequency signals to an appropriate computer (e.g. of the type already described in reference to FIGURE 4), in the event that such a computer is employed as an aid to the operator.

Indicator 88 comprises a storage type cathode ray tube having writing and erasing beams as well as associated deflection and control circuits (not illustrated), and is adapted to provide a PPI type of display. The tube 88 is operated so that the beam axis rotates synchronously with the antenna 85; and for this purpose, control signals may be derived on a line 90 from the drive and coupling unit 86. The radial deflection of the display on tube 88 is made proportional to range in a conventional manner. The writing and erasing beams in tube 88 are so controlled that at any instant a given elementary surface on the face of the storage tube is subjected to either the writing or erasing beam, depending on applied controls. To this effect, a beam control circuit 91 is provided, the operation of which is synchronized by signals on a line 92 derived from the drive unit 86; and the beam control circuit 91 is operative to perform the following functions:

(a) As the beam axis rotates in synchronism with the antenna 85, the erasing beam is turned on during the full time of the radial sweep so that information is erased from the tube from that point on the tube where the beam was last turned on to that point on the face of the tube directly under the beam. In this regard it should be noted that the erasing beam is so selected that substantially complete erasure is effected in response to a single passage of the erasing beam over an energized element on the face of the tube 88.

(b) The foregoing erasing beam is cut off and the writing beam turned on upon receipt of an echo signal from a target detected by antenna 85. The radar unit 87 is so arranged that the duration of a signal output therefrom is standardized so as to always be of the same arc length; and this arc is selected to be relatively narrow, consistent with the design of tube 88. In addition, the writing intensity of the writing beam in tube 88 is so chosen that several passes of the writing beam over the same tube element are required to give a bright visual indication; and this should be distinguished from the operation of the erasing beam wherein a single pass is sufficient to effect erasure.

Recognizing the foregoing operation of the writing and erasing beams, it will become apparent that, in the absence of echo signals, no display will appear on the face of tube 88, since the erasing beam will be continually turned on during rotation of antenna 85. If, however, a target is detected, this target will cause the writing beam to operate and the erasing beam to be rendered inoperative. In the event that the line-of-sight between the vehicles remains substantially parallel to itself, the writing beam will be turned on at substantially the same time during each rotation of antenna 85, whereby a bright visual display will be built up on the face of tube 88 at a limited arc thereon, due to the cumulative action of the writing beam. However, if the line-of-sight between the vehicles does not remain substantially parallel to itself as the motion progresses (which is indicative, of course, of a non-collision course), the time of writing beam turn-on will vary with respect to the rotation of antenna 85, whereby the partial images on the face of storage tube 88 will be successively erased and will not build up to a bright visual image. Thus, whenever echo signals from targets are not erased and are caused to be superimposed on the storage tube 88, a bright visual display indicating a target on a possible collision course with the observing vehicle, will appear on the face of said storage tube 88.

It is clear from the discussion already given in reference to FIGURE 4 that storage tube 88 can, in addition to receiving target information of the type described, be caused to display range information as well as rate-of-closure information derived from appropriate outputs of radar unit 87. All of this information, when displayed on the face of tube 88, will provide the operator of the observing vehicle with sufficient data to select and effect a modified non-collision course. It will further be appreciated that the information mentioned previously can be coupled to output lines such as 93 and 94 to effect control of an appropriate steering mechanism, in the event that automatic control is desired; and this automatic control can further be supplemented by pre-programmed information related to traffic rules or conventions of the types already discussed. Indeed, such programming could further include means for returning the vehicle to its original course after the danger of collision has passed.

It will be further apparent that the unit of FIGURE 5, while concerned with a radar type operation, could also be operated as a beacon system. In such an arrangement, a dual system is used similar to that described in conjunction with the basic embodiment of FIGURE 2, or with the interrogator-responder embodiment of FIGURE 4, and the radar unit 87 would then be operated as an interlaced transmitter and receiver. When the indicator 88 is operated in the manner already described, the result will be to retain on the face of tube 88 only those signals which occur at azimuths of sources that are either on a collision course with the observer, or that have a resultant radial motion away from the observer. These latter indications could in turn be eliminated by Doppler frequency sense detection, in the manner already described, whereby the final display will be only of those targets which are on a collision course. Such an indication could, of course, again be supplemented by other information, such as might be desired to aid an operator in the selection of an appropriate non-collision course.

While I have thus described preferred embodiments of the present invention particularly tailored to airborne vehicles, it must be understood that the method of the present invention can be embodied in systems other than those specifically illustrated adapted for vessels on the sea, as well as for ground vehicles; and it must be further understood that the various systems described can be changed in manners readily apparent to those skilled in the art. The foregoing discussion is, therefore, meant to be illustrative only and should not be considered limitative of my invention; and all such variations and modifications as are in accord with the principles described are meant to fall within the scope of the appended claims.

Having thus described my invention, I claim:

1. In combination, a moving vehicle, and control means on said vehicle adapted to determine when said vehicle is on a collision course with an interfering object, said control means comprising first means for measuring the tangential component of relative velocity between said vehicle and object, said first means being operative to produce a first control signal when said tangential component has a magnitude below a predetermined limit indicative of the line-of-sight between said vehicle and object remaining substantially parallel to itself as the relative motion between said vehicle and object progresses, second means for measuring the radial component of relative velocity between said vehicle and object, said second means being operative to produce a second control signal when said radial component has a sense indicative of said vehicle and object approaching one another as said relative motion progresses, and third means responsive to the simultaneous presence of said first and second control signals for indicating the presence of a collision course between said vehicle and object.

2. The combination of claim 1 wherein said control means includes receiver means carried by said vehicle for receiving radiant energy from said interfering object, and directional antenna means carried by said vehicle and coupled to said receiver means for intercepting said radiant energy from said interfering object only when said object is located within a solid angle of substantially $2\pi$ steradians forward of and symmetrical with the axis of said moving vehicle.

3. The combination of claim 2 wherein said second means comprises means for measuring Doppler components of energy radiated from said interfering object to said moving vehicle.

4. The combination of claim 2 wherein said first means comprises means for storing signals corresponding to said received radiant energy during successive time intervals, and means for periodically comparing said stored signals.

5. The combination of claim 4 wherein said storing means comprises a magnetic recorder.

6. The combination of claim 4 wherein said storing means comprises a cathode ray storage tube.

7. In a system for determining whether first and second objects moving relative to one another are on collision courses, control apparatus comprising the combination of first means for successively measuring the radial component of relative velocity between said objects as said relative motion progresses, second means for successively measuring the tangential component of relative velocity between said objects as said motion progresses, and means responsive to changes in said successively measured radial and tangential components for indicating the presence of a collision course when both of said components are changing within predetermined limits.

8. The combination of claim 7 including means responsive to said last-named means for altering the course of at least one of said objects.

9. The combination of claim 8 wherein each of said objects carries said control apparatus, and means for determining which of said objects is to have its course altered.

10. The combination of claim 7 wherein said first and second means comprise portions of a radar apparatus carried by one of said objects.

11. The combination of claim 7 wherein said first and second means comprise portions of an interrogator-responder apparatus carried by one of said objects.

12. In a system for determining whether first and second objects moving relative to one another are on collision courses, the combination of means for making successive measurements of the line-of-sight between said objects during successive time intervals as said relative motion progresses, first comparison means coupled to said measurement means and responsive to said successive line-of-sight measurements for determining whether said line-of-sight exhibits rotation as said motion progresses, means coupled to said first comparison means for producing a first control signal when said line-of-sight exhibits such rotation at an angular rate less than a predetermined rate, means for determining the component of relative velocity between said objects along said lines of sight during each measurement of said measurement means, second comparison means for determining whether said relative velocity component is changing, and the sense of said change, as said motion progresses, means coupled to said second comparison means for producing a second control signal when said relative velocity component is changing in a predetermined sense, and control means operative when both said first and second control signals are simultaneously present for altering the course of at least one of said first and second objects.

13. The combination of claim 12 including means for measuring both the range between and relative velocity of said first and second objects, and means responsive to the ratio of said range and relative velocity for controlling the rate at which said control means responds to said control signals.

14. The combination of claim 12 wherein said measurement means includes a sensor carried by one of said objects responsive to high frequency energy radiated from the other of said objects, said sensor including means for deriving both video signals and Doppler sense signals from said high frequency energy, said first and second comparison means including means for continuously recording both said video signals and said Doppler sense signals, means for reading the signals recorded in said recorder thereby to derive said first and second control signals, and means responsive to said first and second control signals for producing an output collision signal indicative of a collision course between said objects in response to simultaneous presence of said first and second control signals.

15. The combination of claim 14 including display means, means for coupling said received video signals to said display means, said display means being normally non-responsive to said received video signals, and gating means responsive to occurrence of said output collision signal for permitting said received video signals to control said display means.

16. The combination of claim 12 wherein said first comparison means comprises a multi-channel magnetic recorder, means for recording signals indicative of said successive line-of-sight measurements in different ones of said channels during successive time intervals, means for periodically reading the recorded signals simultaneously out of plural ones of said channels, and means for periodically erasing the channel of said recorder containing the oldest of said recorded signals.

17. A collision apparatus for indicating the presence of a collision course between two vehicles moving relative to one another comprising a receiver on at least one of said vehicles receiving a signal which varies with variations in the relative position of said vehicle, first means responsive to said signal for detecting apparent angular rotation of a line-of-sight between said vehicles as said relative motion progresses, second means responsive to the same said signal for substantially simultaneously detecting the sense of the component of relative velocity substantially along said line-of-sight between said vehicles as said relative motion progresses, and indicator means jointly responsive to said first and second means for indicating the presence of such a collision course when said line-of-sight rotation and relative velocity component sense each fall within predetermined limits.

18. An apparatus for determining whether two vehicles moving relative to one another are approaching one another in such manner as to tend to fall within a predetermined minimum distance desired between said vehicles, comprising first means on one of said vehicles responsive to a received signal indicative of the instantaneous position of the other of said vehicles relative to said one vehicle for detecting apparent angular rotation of a line-of-sight between said vehicles as said relative motion progresses, second means on said one vehicle responsive to Doppler components in the same said received signal for substantially simultaneously detecting the sense of the component of relative velocity substantially along said line-of-sight between said vehicles as said relative motion progresses, and output means jointly responsive to said first and second means for producing an output signal when said line-of-sight rotation and relative velocity component sense each fall within predetermined limits.

19. A collision apparatus for indicating the presence of a collision course between two vehicles moving relative to one another comprising receiver means on one of said vehicles for receiving a signal indicative of the instantaneous position of the other of said vehicles relative to said one vehicle, said receiver means including means responsive to Doppler components of said received signal for detecting apparent angular rotation of a line-of-sight between said vehicles and for substantially simultaneously detecting the sense of the component of relative velocity substantially along said line-of-sight between said vehicles as said relative motion progresses, and means coupled to said receiver means for producing a characteristic output indicative of the presence of such a collision course when said line-of-sight rotation and relative velocity component sense each fall within predetermined limits.

References Cited in the file of this patent

UNITED STATES PATENTS 2,969,539     Miner _____ Jan. 24, 1961

OTHER REFERENCES

"Research and Development on Aircraft Proximity Warning and Collision Avoidance Techniques," April 30, 1958, Bendix Radio; Division of Bendix Aviation Corp., Baltimore, Md., 90 pp. (pp. 35–39 relied on).

"Physical Aspects of Collision Avoidance," by J. Morrell, IRE Transactions on Aeronautical and Navigational Electronics, June 1957, p. 80.